United States Patent
Ballard (10) Patent No.: US 12,430,531 B2
(45) Date of Patent: Sep. 30, 2025

(54) METHOD OF MANUFACTURING A CARD-SHAPED DATA CARRIER AND LAMINATION PLATE THEREFOR

(71) Applicant: Giesecke+Devrient Mobile Security GmbH, Munich (DE)

(72) Inventor: Kevin Lee Ballard, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/149,220

(22) Filed: Jan. 3, 2023

(65) Prior Publication Data
US 2024/0220759 A1 Jul. 4, 2024

(51) Int. Cl.
*G06K 19/077* (2006.01)

(52) U.S. Cl.
CPC .............. *G06K 19/07722* (2013.01)

(58) Field of Classification Search
CPC .................................... G06K 19/07722
See application file for complete search history.

(56) References Cited

U.S. PATENT DOCUMENTS

| | | | | |
|---|---|---|---|---|
| 3,874,586 | A * | 4/1975 | Foote | G06K 7/08 360/2 |
| 4,501,646 | A * | 2/1985 | Herbert | C25D 1/02 205/101 |
| 7,757,538 | B2 | 7/2010 | Mitterhofer et al. | |
| 9,649,871 | B2 * | 5/2017 | Bargir | B42D 25/369 |
| 10,783,426 | B2 * | 9/2020 | Finn | H01Q 1/2225 |
| 11,361,204 | B2 * | 6/2022 | Cox | G06K 19/07771 |
| 2001/0028936 | A1 * | 10/2001 | Nishiyama | G11B 7/261 |
| 2003/0137065 | A1 * | 7/2003 | Medower | C25D 1/10 264/1.33 |
| 2004/0121257 | A1 * | 6/2004 | Kaminsky | B42D 25/378 428/913 |
| 2009/0280649 | A1 * | 11/2009 | Mayer | H01L 21/7684 156/345.23 |

(Continued)

FOREIGN PATENT DOCUMENTS

DE 102007062123 A1 6/2009
DE 102015015908 A1 6/2017

(Continued)

OTHER PUBLICATIONS

Extended European Search Report from Corresponding European Patent Application No. EP24020002.2, May 31, 2024.

*Primary Examiner* — Steven S Paik
*Assistant Examiner* — Asifa Habib
(74) *Attorney, Agent, or Firm* — Workman Nydegger (57) ABSTRACT

The invention relates to a method of manufacturing a card-shaped data carrier, such as an identification card, and includes the steps of: providing a card body with printed features and with an overlay layer disposed over the printed features; providing a press tool having a profile corresponding to a predetermined shape registered to the printed features on the card body, wherein the profile is provided by an electroformed layer; and embossing the profile of the press tool in the overlay layer. A lamination plate is provided for embossing an overlay layer of such data carrier, including a profile with a predetermined shape. The profile is registered to printed features on the card body, and the profile is provided by an electroformed layer.

14 Claims, 3 Drawing Sheets

(56) References Cited

U.S. PATENT DOCUMENTS

| | | | |
|---|---|---|---|
| 2010/0172000 A1* | 7/2010 | Holmes | B42D 25/29 |
| | | | 359/2 |
| 2017/0053753 A1* | 2/2017 | Adams | H01H 13/023 |
| 2020/0151534 A1* | 5/2020 | Lotya | G06K 19/07722 |
| 2020/0193250 A1* | 6/2020 | Ormiston | G06K 19/12 |
| 2022/0209168 A1* | 6/2022 | Kong | H10K 59/8794 |
| 2023/0399736 A1* | 12/2023 | Leppäniemi | H05K 3/048 |

FOREIGN PATENT DOCUMENTS

| | | | |
|---|---|---|---|
| EP | 1629994 A2 | | 3/2006 |
| WO | WO-2020054571 A1 | * | 3/2020 |

\* cited by examiner

METHOD OF MANUFACTURING A CARD-SHAPED DATA CARRIER AND LAMINATION PLATE THEREFOR

BACKGROUND

The present invention relates to the field of card-shaped data carriers, such as identification cards, in particular in ID1 format, and the manufacturing thereof. In particular, the invention relates to the manufacturing of identification cards having a multi-layered structure including a card body with printed features and at least one overlay layer laminated to the card body.

Card-shaped data carriers, such as identification cards, are widely used in everyday life as a medium e.g. for identification, authentication and storing individual information. Card-shaped data carriers, such as identification cards, are used in particular as ID cards, access cards, driver license cards and/or membership cards for the identification of an individual, but are also well established in related fields, for example as debit cards, credit cards or other financial transaction cards in the field of finances.

Typically, such cards have a multilayered body made from laminated sheets and comprise at least a card body or core with an overlay layer laminated thereto. The card body includes printed features or artwork that is visible from a face side of the identification card that is covered with the overlay layer. The card may be provided with additional security and/or optical features, for example providing an embossed or debossed appearance for features printed on the card body. These additional security or optical features must be registered to and precisely aligned with the artwork beneath the overlay layer on the card body in order to provide the desired appearance and/or optical effect. The known methods of manufacturing identification cards achieve satisfactory levels of registering the additional optical features to the artwork by applying varnish on the overlay layer laminated to the card body, in particular by means of a silk-screen or digital printing press followed by UV- or heat-curing, which is commonly referred to as a post-lamination varnishing (PLV) process.

The major disadvantages of the post-lamination varnish process are, among others, high scrap rates due to registration issues with the highly variable laminated sheets and scheduling issues related to the time delay created by interrupting the flow of materials from lamination, to printing, curing and cutting.

SUMMARY

In one aspect, the invention aims to eliminate the post-lamination varnishing process when manufacturing, in particular mass-producing, card-shaped data carriers, such as identification cards.

In another aspect of the present invention, a method of manufacturing such data carriers is provided, the method comprising the steps of:
providing a card body with printed features and with an overlay layer disposed over the printed features;
providing a press tool having a profile corresponding to a predetermined shape registered to the printed features on the card body, wherein the profile is provided by an electroformed layer of the press tool; and
embossing the profile of the press tool in the overlay layer and above the printed features.

The method in particular relates to the manufacturing of identification cards of the type having a multilayered structure including a card body and an overlay layer laminated thereto. The card body may be embodied by a single layer or may include a multilayered substructure of in particular laminated sheets. Providing the card body may include providing sheets of card bodies prior to cutting. Preferably, the overlay layer may also be provided in sheets for mass production. The overlay layer may in particular be disposed on a sheet of card bodies before or after lamination. The term "disposed on" is to be interpreted in a broad sense and substantially relates to a plane-parallel arrangement of the substantially planar sheets of input materials constituting the overlay layer and the card body. The card body and/or the overlay layer may in particular be provided as sheets of polymer materials or at least including polymer materials. The overlay layer is transparent or translucent at least in an area overlying the printed features.

The card body is provided with the printed features, such as artwork, that are visible from a face side of the card through the overlay layer. The step of embossing the profile includes producing a three-dimensional structure of predetermined shape into a surface of the overlay layer. The predetermined structure is precisely registered to and aligned with the printed features visible on the card body. The structure embossed in the overlay layer may resemble an embossed or debossed design and is determined by the profile of the press tool, for example a lamination plate that is pressed into the overlay layer during embossing and/or lamination. The invention in particular suggests providing suitable tooling, which is manufactured by electroforming, to account for a precise registration to the printed features on the card body and low manufacturing tolerances.

Electroforming is an electrochemical process of manufacturing parts by electrodeposition of metal, in particular in an electroforming apparatus. An electroforming apparatus includes a tank containing an electrolytic solution. An anode, typically made from a metal, and a cathode including a so-called mandrel are submerged in the electrolytic bath contained in the tank. Preferably, the electrolytic solution (bath) contains ions of the metal to be disposed on the mandrel. The anode and the cathode are connected to the respective poles of a DC power source during electroforming. The DC current source may in particular be adapted to provide a constant DC current or pulses of DC currents. Application of the DC current induces the deposition of a layer on the submerged mandrel (electrodeposition). The layer formed on the mandrel includes a surface structure that precisely corresponds to the inverse of the surface structure of the mandrel.

In the context of this specification, the terms "electroforming" and "electrodeposition" are used interchangeably.

The profile of the press tool is provided by a layer which is manufactured into a predetermined shape or relief by electroforming. The profile is embossed into the overlay layer of the card. The overlay layer is embossed to exhibit a structure that creates, together with the printed features on the card body, a desired visual effect or appearance. For example, the printed features on the card body are provided with an embossed or debossed appearance effectuated by the embossed overlay layer. The profile of the press tool is registered to the printed features of the card body in the sense that the embossed structure of the overlay layer and the printed features on the card body create a predetermined visual effect or appearance.

The post-lamination varnishing (PLV) process may be eliminated by embossing the structure into the overlay material. Furthermore, this way, chemical exposure to varnish chemicals may substantially be eliminated except in tool manufacturing, which may, according to some embodiments, involve manufacturing a single prototype or master sheet by applying varnish in a post-lamination process. Since the exact scale cannot be changed once the press tool has been created by electrodeposition, setup variations, in particular due to screen stretch during PLV, may be eliminated, allowing for improved registration with the printed features on the card body. The proposed method of manufacturing cards contributes to lower production costs and reduced lead-times, in particular by utilizing a press tool that is precisely formed by electrodeposition into a predetermined shape registered to the printed features on the card body or bodies.

In at least some embodiments, the press tool is a lamination plate adapted to be pressed, in particular hot-stamped, into the overlay layer disposed on the card body. In some embodiments, the lamination plate may be configured to be pressed by a pneumatic, hydraulic or electrically actuated press of a laminator to impose the desired structure onto the overlay layer of the identification cards. In some embodiments, the laminator is a down- or up-acting platen press.

In some embodiments, the step of providing the press tool further includes:
  providing a master sheet by applying varnish on a first overlay layer disposed on, for example laminated to, a first card body having printed features, wherein the varnish is applied in at least one area of a surface of the first overlay layer to create a varnish layer corresponding to the predetermined shape registered to the printed features on the first card body
  metalizing a surface of the master sheet in at least an area of the varnish layer; and
  manufacturing a father sheet, including a profile corresponding to the predetermined shape, from the master sheet, wherein manufacturing of the profile of the father sheet includes:
  connecting the master sheet to a cathode of a DC current source to provide a first mandrel in an electroforming apparatus and
  forming a first layer of the father sheet in at least the area of the varnish layer of the master sheet by electrodeposition in the electroforming apparatus.

In some embodiments, the master sheet is provided to resemble a prototype of a card-shaped data carrier to be produced and is manufactured by applying varnish in at least some areas of the first overlay layer after lamination. In particular, applying varnish may involve silk-screen or digital printing. The varnish is preferably applied to the overlay layer to create a raised structure corresponding to the predetermined shape registered to the printed features on the card body. The surface structure of the master sheet is preferably reproduced by means of electroforming, which includes metalizing the respective surface areas of the master sheet to be reproduced and subsequent electrodepositioning of the first layer. The master sheet is preferably used as the mandrel of the electroforming apparatus to provide the first layer of the father sheet with a profile that corresponds to the inverse of the varnish layer disposed on the first overlay layer.

In other words, tooling may in particular be created from a single sheet subjected to a post-lamination varnishing (PLV) process, which is prepared as the master sheet (or press master). The master sheet is created and registered to the printed features on the card body, which typically includes artwork. The master sheet is subsequently used as the first mandrel when electroforming the first layer. In some embodiments, the appearance of the master sheet or a printed copy thereof may be subject to customer approval prior to tool production.

In some embodiments, the first layer of the father sheet is used as a lamination plate for embossing the overlay layer of the card. The first layer may be adapted to emboss a structure corresponding to a single card into an overlay layer. Preferably, the father sheet is adapted to emboss a structure corresponding to a plurality of cards in a planar arrangement into the overlay layer and may in particular be configured to operate on batches of input material provided to the press tool, for example the laminator, in single sheets.

Alternatively, copies of the father sheet are produced and used for embossing the profile in the overlay layer of the identification card or batches thereof. Preferably, the copies of the father sheet are manufactured by electroforming. Since electroforming results in an inversion of the relevant structural features of the copied part, it is preferred to manufacture a mother sheet from the father sheet and at least one third-generation sheet from the generated mother sheet.

In some embodiments, the step of providing the press tool further includes:
  manufacturing a mother sheet, including an inverted profile, from the father sheet, wherein manufacturing of the inverted profile of the mother sheet includes:
  connecting the father sheet to a cathode of a DC current source to provide a second mandrel in an electroforming apparatus; and
  forming a second layer in at least the area of the profile of the father sheet by electrodeposition in the electroforming apparatus; and
  manufacturing a third-generation sheet including the profile with the predetermined shape from the mother sheet, wherein manufacturing of the profile of the third-generation sheet includes:
  connecting the mother sheet to a cathode of a DC current source to provide a third mandrel in an electroforming apparatus; and
  forming a third layer in at least the area of the inverted profile of the mother sheet by electrodeposition in the electroforming apparatus.

The third layer of the third-generation sheet resembles a copy of the first layer of the father sheet and may preferably be used as a press tool for embossing the profile disposed thereon in the overlay layer of the card. The third layer may in particular be used in a similar manner as, or as a substitute for, the first layer of the father sheet as described herein before.

In some embodiments, the step of embossing the profile in the overlay layer of the card body further includes:
  pressing the profile disposed on the first layer of the father sheet or the third layer of the third-generation sheet into the overlay layer disposed on the card body.

A further advantage provided by the present disclosure is that the profile provided by the electroformed layer may include a lens-forming structure, in addition to the predetermined shape registered to the printed features on the card body. Thus, by pressing the profile into a transparent surface area of the overlay layer, a lens structure may be embossed thereinto. Image elements provided on the card body underneath such a lens structure may appear as a tilting image depending on the viewing angle. The image elements of the tilting image may be created on the card body either before applying or embossing the overlay layer or, preferably, by laser inscription through the lens structure (CLI) after the lens structure has been embossed into the overlay layer. This way, not only is the PLV process avoided, but the lens structure may be embossed along with the embossing of the profile replacing the PLV process.

In some embodiments, the step of pressing the profile into the overlay layer occurs in a laminator, in particular the laminator described herein before. As compared to the prior art PLV process, it is not necessary to interrupt the processing cycle, but the structure can be produced on the card within the lamination manufacturing line.

In particular, in some embodiments, the step of pressing the profile into the overlay layer further includes:
  providing the profile disposed on the first layer of the father sheet or the third layer of the third-generation sheet as a lamination plate; and
  laminating the overlay layer to the card body by pressing the lamination plate into the overlay layer disposed on, or adjacent to, the card body.

In other words, laminating the overlay layer to the card body and embossing the overlay layer to the predetermined shape occurs in parallel, in particular by means of a laminator that is configured to operate on sheets of input materials.

In some embodiments, providing the profile disposed on the first layer of the father sheet or the third layer of the third-generation sheet as a lamination plate may include grinding the respective layer in order to provide the profile with an even contact surface. The back surface of the lamination plate may also be ground flat and parallel with the contact surface.

In some embodiments, the profile of the lamination plate may correspond to an image to be pressed into sheets of overlay layers during lamination.

In some embodiments, the step of laminating includes transferring heat between the lamination plate of the laminator and the overlay layer of the identification card. The laminating plate may in particular be coupled to a heat sink for heat transfer and/or be otherwise configured to heat and/or cool the overlay layer during the lamination and/or embossing step of the proposed method.

In some embodiments, at least one of the first, second and third layer comprises at least one of nickel, cobalt and an alloy thereof. In some beneficial embodiments, at least one of the first, second and third layer, preferably the first layer of the father sheet and/or the third layer of the third-generation sheet, consists of pure nickel or a nickel-cobalt alloy. Nickel may provide for good thermal conductivity and heat transfer during lamination, which in turn may shorten lamination cycles. Nickel-cobalt alloys may in particular provide lamination plates with enhanced hardness, providing abrasion resistance without special coating or heat-treating. Lamination plates are typically subject to degradation in performance due to scratching. Providing lamination plates with sufficient hardness may reduce the need to coat these parts with special coatings for, in particular, abrasion resistance, or may make such special coatings obsolete. Lamination plates, in particular made from nickel, cobalt and/or a nickel-cobalt alloy, without special coatings may easily be repolished, for example by means of an abrasive.

In some preferred embodiments, the laminator in which the above-described plates are employed is adapted for single-sheet lamination. The laminator may be configured to operate on sheets of card bodies and one or more overlay layers provided thereto as input materials prior to cutting. The laminator may in particular be configured to emboss a sheet of an overlay layer and to laminate the sheet of the overlay layer to a sheet of card bodies. The laminator may be configured to exert pressure on the lamination plate, the card body and the overlay layer in a direction substantially orthogonal to the substantial planar overlay layer disposed on the card body, in particular adjacent to the face side of the card body including the printed features.

In some embodiments, the step of laminating the overlay layer to the card body further includes fixing at least one of the overlay layers and the card body with respect to the lamination plate by means of vacuum suction, which may help to prevent any translation of motion, in particular during robot drop or machine closing.

In some embodiments, vacuum is provided in at least a part of the laminator by suction, in particular to remove air entrapped between the sheets of input materials constituting the overlay layer and the card bodies, which in turn allows for high-fidelity, defect-free embossing.

In another aspect of the invention, a lamination plate for embossing an overlay layer of a card-shaped data carrier, such as an identification card, preferably in ID1 format, is provided. The lamination plate comprises a profile corresponding to a predetermined shape, wherein the profile may in particular be registered to printed features on a card body of the data carrier. The profile is provided by a layer that is electroformed into the predetermined shape by an electroformed layer.

The lamination plate may in particular be used as the press tool for embossing a relief corresponding to the profile in the overlay layer and/or for laminating the overlay layer to the card body, as described herein before.

Preferably, the layer comprises at least one of nickel, cobalt and an alloy thereof for enhanced thermal conductivity and/or hardness.

BRIEF DESCRIPTION OF THE DRAWINGS

In the following, the invention will be described in more detail with respect to specific embodiments depicted in the figures.

DETAILED DESCRIPTION OF THE INVENTION

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Figure 1:
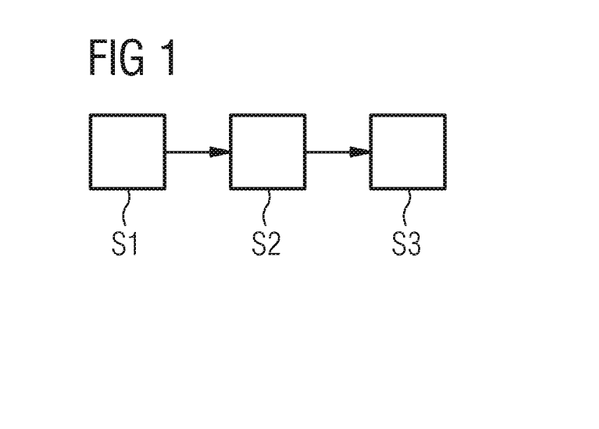
FIG. 1 illustrates the steps of a method of manufacturing a card-shaped data carrier according to an embodiment of the invention in a flow chart.
Figure 2:
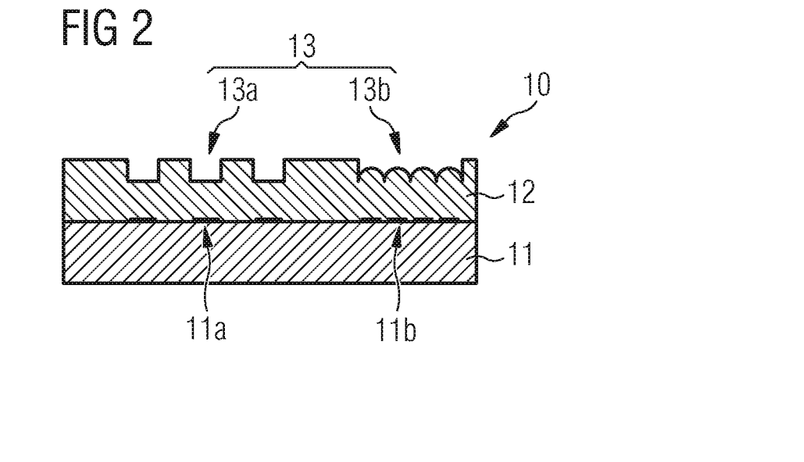
FIG. 2 shows schematically a cross-section of a card-shaped data carrier, such as an identification card, having a multilayered structure including an overlay layer and a card body in a schematic cross-section.

FIG. 1 illustrates steps of a method of manufacturing a card-shaped data carrier, such as an identification card 10, according to a specific embodiment in a flow chart. The identification card 10 is shown in more detail in FIG. 2. The identification card 10 has a multilayered structure comprising a card body 11 and an overlay layer 12. In the specific embodiment depicted in the FIG. 1, the overlay layer 12 is laminated to a face side of the card body 11. The face side of the card body 11 exhibits printed features, typically artwork. The overlay layer 12 is machined into a predetermined shape or relief 13 by embossing. The predetermined shape of the overlay layer 12 is registered to the printed features 11a on the card body 11 to create together with the printed features 11a on the card body 11 a desired visual effect or appearance. For example, the relief 13 of the overlay layer 12 includes a first embossed structure 13a which provides an embossed or debossed appearance for the printed features 11a on the card body 11 and a second embossed structure 13b which provides lenses for visualizing printed or, more preferably, laser-inscribed features 11b on the card body 11. This way, when viewing through the lenses from different viewing angles, tilting images can be generated, called CLI. The laser-inscribed features 11b may be provided on the surface of the card body 11 either before the application or embossing of the overlay layer or, more preferably, inscribed into the surface of the card body 11 through the lenses-providing embossed structure 11b.

The method of manufacturing the identification card 10 comprises the steps S1, S2, S3 of:
  providing the card body 11 with the printed features 11a and with the overlay layer 12 above the printed features 11a in a first step S1;
  providing a press tool 100 having a profile 101 corresponding to the predetermined shape registered to at least the printed features 11a on the card body 11 in a second step S2, wherein the profile 101 of the press tool 100 is provided by an electroformed layer 710, 910 corresponding to the predetermined shape registered to the printed features 11a on the card body 11 by means of an electroforming apparatus 600; and
  embossing the profile 101 of the press tool 100 in the overlay layer 12 and above the printed features 11a, in a third step S3.

Figure 3:
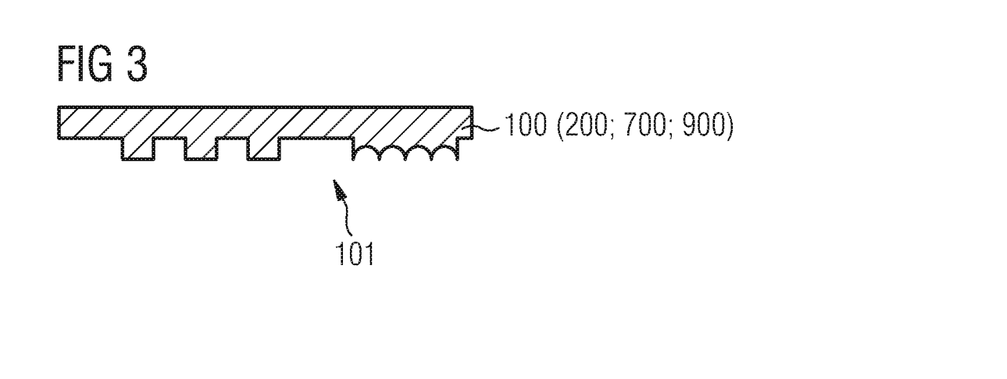
FIG. 3 shows schematically a cross-section of a press tool or lamination plate, respectively a father or third-generation sheet, having a profile corresponding to a predetermined shape.

The profile 101 of the press tool 100 used for embossing the surface of the overlay layer 12 is illustrated in the cross-sectional view of FIG. 3. In the specific embodiment, the press tool 100 is configured as a lamination plate 200 adapted to be pressed into the overlay layer 12 for both embossing and laminating the overlay layer 12 to the card body 11 of the identification card 10.

Preferably, the third step S3 of embossing the profile 101 in the overlay layer 12 disposed on the card body 12 further includes:
  pressing the profile 101 disposed on the press tool 100, in particular the lamination plate 200, into the overlay layer 12 disposed on the card body 11 of the identification card 10 and/or
  laminating the overlay layer 12 to the card body 11 by pressing the lamination plate 200 into the overlay layer 12 disposed on the card body 11.

Figure 4:
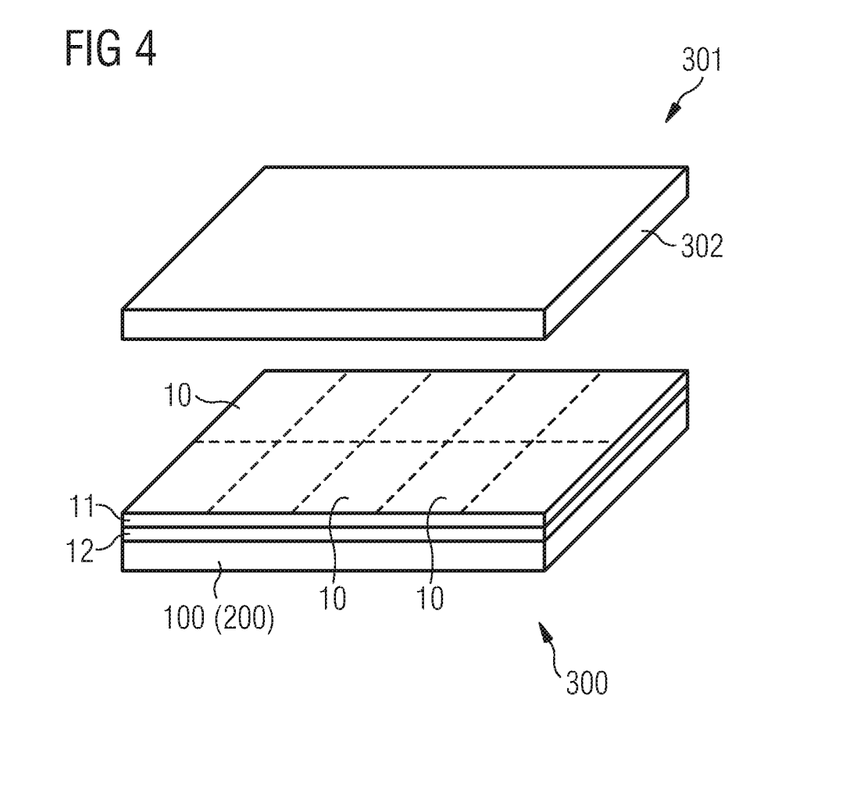
FIG. 4 illustrates schematically a laminator.

The press tool 100 in the form of a lamination plate 200 is adapted to exert pressure on the overlay layer 12 and the card body 11 during lamination. The lamination plate 200 is typically part of a laminator 300 that includes, as schematically illustrated in FIG. 4, a press 301 for exerting pressure on the overlay layer 12 and the card body 11, or sheets thereof, which are disposed between the lamination plate 200 and a stamp 302 of the press 301. The laminator 300 may in particular be configured as an up- or down-acting platen press. The press 301 may in particular be configured as a pneumatic, hydraulic or electric actuated press.

The lamination plate 200 is precisely aligned in a fixture of the laminator 300, which provides registration accuracy between the printed features 11a on the card bodies 11 and the structure 13a imposed on the overlay layer 12 by embossing.

Preferably, a robot uses optical features on the collated sheets of input materials constituting the card bodies 11 and the overlay layer 12 to precisely pick up a sheet and place it adjacent to the lamination plate 200 disposed in the fixture of the laminator 300. Having precise control of where the sheet is picked, it may be placed always in the same location in the laminator 300, for every cycle, which guarantees the required registration accuracy.

At this stage, the registration of the embossing relative to the printed features may be inspected. The positioning of the sheets of card bodies 11 and overlay layers 12 or, respectively, the drop position of the robot is one variable that may require adjustment. For example, an offset in the x- and/or y-direction may be defined via an entry on a console in order to precisely align all products to be manufactured.

Upon load-in to the laminator 300, the sheets of input materials constituting the overlay layer 12 and the card bodies 11 are held in place by means of vacuum suction, which may prevent translational movement during robot drop or machine close. As the laminator apparatus 300 closes, air that is entrapped between the input materials and the lamination plate 200 may also be removed by means of vacuum suction, ensuring high-fidelity, defect-free embossing. Upon completion of the lamination, the vacuum is transferred to the opposite face, which may ensure that the opening action of the laminator apparatus 300 separates the newly embossed sheet of card bodies 11 laminated to the overlay layer 12 from the lamination plate 200.

Preferably, the step of laminating the overlay layer 12 to the card body 11 further includes transferring heat between the lamination plate 200 of the laminator 300 and the overlay layer 12 of the identification card. The profile 101 may in particular be hot-stamped into the overlay layer 11 during lamination.

As indicated by the dashed lines in FIG. 4, a plurality of identification cards 10 may be embossed and laminated in the laminator 300. The laminator 300 is adapted for single-sheet lamination to provide laminated sheets of overlay layers and card bodies, which are preferably cut in a subsequent step.

Figure 5:
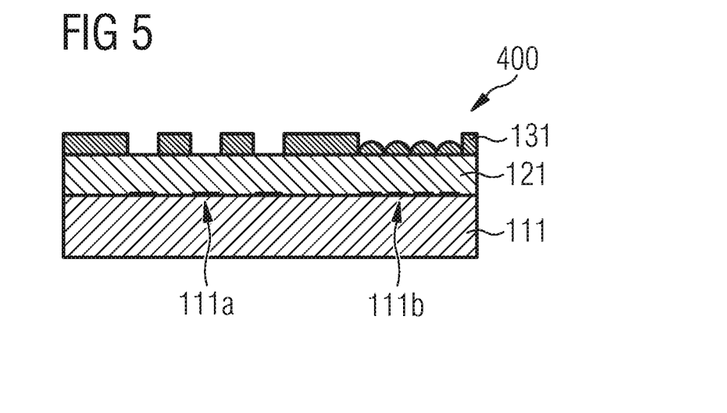
FIG. 5 shows the structure of a master sheet manufactured by a post-lamination varnishing process in a schematic cross-sectional view.

The profile of the press tool 100 or lamination plate 200 is manufactured by electroforming from a master sheet 400 depicted in FIG. 5. The tool manufacturing process includes, according to an embodiment of the invention, manufacturing of a single laminated master sheet 400 that is silk-screened and cured through a post lamination varnish process, as described herein before. A screen is produced based on customer artwork and registered to the laminated sheet of a first overlay layer 121 and a first card body 121, which represent an identity card 10 to be produced. This ensures that the shrink rate of the sheet is captured in the process, and the screen is stretched to properly locate the varnished features. The master sheet 400 is provided by applying varnish on the first overlay layer 121 disposed on the first card body 111, wherein the varnish is applied in at least one area of a surface of the first overlay layer 121 to create a varnish layer 131 corresponding to the predetermined shape registered to the printed features 121a on the first card body 111.

The selected varnish is preferably non-water soluble and chemically compatible with weak acid solutions. The manufactured sheet is preferably thoroughly inspected for completeness of images and quality on all sheet positions. Any imperfections result in a remake. Upon successful completion, the varnished sheet is deemed the master sheet 400.

The surface of the master sheet 400 is metalized, in particular in the surface area of the varnish layer 131, for example via silver spray deposition (aerosol), chemical vapor deposition, electron beam deposition, sputter coating, or another thin-film metal depositing technique.

The metalized master sheet 400 is subsequently cleaned, optionally passivated and placed on a conductive backplane to create a first mandrel 401 in an electroforming step of a father sheet 700. The backplane is a fixture that is designed to hold the master sheet 400 in a flat position and provides electrical conductivity between the metalized surface of the master sheet 400 and a cathode of a DC current source during electrodeposition of a metal in an electroforming apparatus 600, as depicted in more detail in FIG. 6.

Figure 6:
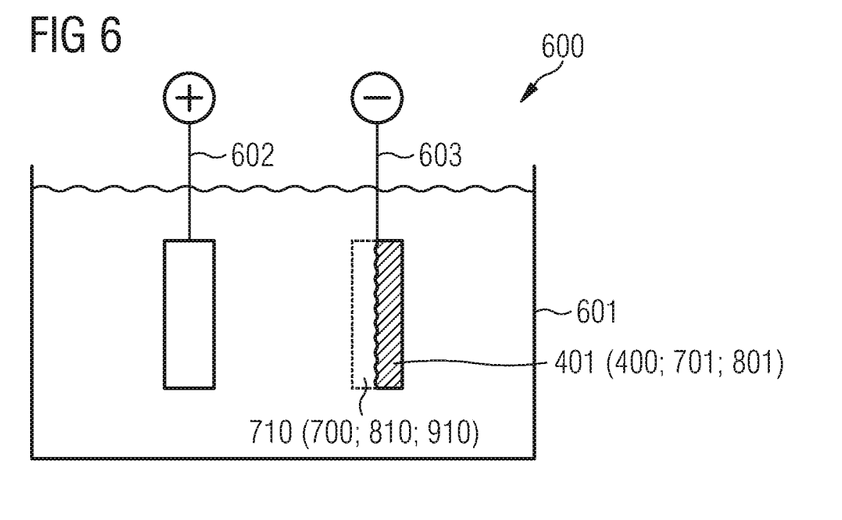
FIG. 6 shows schematically an electroforming apparatus.

The electroforming apparatus 600 includes a tank 601 containing an electrolytic solution. An anode 602 and a cathode 603, which includes a mandrel 401 formed by the master sheet 400, are submerged in the electrolytic bath contained in the tank 601. The anode 602 and the cathode 603 are connected to the respective poles of a DC current source during electroforming. Application of the DC current induces deposition of a layer 710 on the submerged mandrel 401. When the master sheet 400 is used as the first mandrel 401, a first layer 710 is formed on the mandrel 401 and constitutes the father sheet 700, which includes a surface structure having a profile 102 that precisely corresponds to the inverse of the varnish layer 131 disposed on the first overlay layer 121 of the master sheet 400.

For electrodeposition of the first layer 710, the first mandrel 401 is connected to the negative (cathode) pole of the DC current source, for example a DC rectifier, and then suspended in the tank 601. The anode 602 may be made from a metal to be deposited on the mandrel 401, in particular nickel and/or cobalt, or may include a basket containing this metal. The anode 602 is suspended in the electrolytic bath opposite the master sheet 400 acting as the first mandrel 401 and connected to the positive pole of the DC source.

The temperature of the electrolytic solution contained in the tank 601 is preferably controlled and/or monitored. Optionally, the electroforming apparatus 600 includes a solution circulation pump. According to some embodiments, nickel pellets are disposed within the tank 601. The tank 601 may for example contain a nickel-sulfamate plating solution for the deposition of a nickel layer on the cathode 603. Preferably, a DC current is applied until the deposited layer 710 of metal, in particular nickel, on the surface of the mandrel 401 achieves the desired thickness, for example 1 mm or less.

The first mandrel 401 is then removed from the tank 601 and the electroformed first layer 710 is removed from the mandrel 401, yielding a surface with an exact negative copy of the textures from the original master sheet 400 in a solid metal. The negative orientation of the image is what is needed to press the positive image of the predetermined shape into the manufactured sheets in the lamination process.

The first generation sheet generated by electroforming from the master sheet 400 is also referred to as the father sheets 700, father tool or mother-maker tool. The father sheet 700 includes the profile 101 corresponding to the predetermined shape, which is provided by the first layer 710 electroformed on the master sheet 400. The father sheet 700, or a copy thereof, may be used for embossing the overlay layer 11. Optionally, the father sheet 700 including the first layer 710 may be manufactured into a lamination plate 200 for both embossing and laminating the identity cards 10.

The master sheet 400 is preferably preserved in case there is any damage to the father sheet 700, which might require another copy. Preferably, the father sheet 700 is copied by means of electroforming, which typically involves generating a mother sheet 800 from the father sheet 700 and at least a third-generation sheet 900 from the mother sheet 800.

In other words, the second step S2 of providing the press tool 200 preferably includes further:
manufacturing the mother sheet 800, having an inverted profile 102, from the father sheet 700, wherein manufacturing of the inverted profile 102 of the mother sheet 800 includes:
connecting the father sheet 700 to the cathode 603 of the DC current source in the electroforming apparatus 600 to provide a second mandrel 701;
forming a second layer 810 in at least the area of the profile 101 of the father sheet 700 by electrodeposition in the electroforming apparatus 600; and
manufacturing the third-generation sheet 900 including the profile 101 corresponding to the predetermined shape from the mother sheet 800, wherein manufacturing of the profile 101 of the third-generation sheet 900 includes:
connecting the mother sheet 800 to the cathode 603 of the DC current source to provide a third mandrel 801 in the electroforming apparatus 600; and
forming a third layer 910 in at least the area of the inverted profile 102 of the mother sheet 800 by electrodeposition in the electroforming apparatus.

The father sheet 700 is preferably cleaned, passivated, and attached to another backplane to be used as second mandrel 701. Likewise, the mother sheet 800 is preferably cleaned, passivated, and attached to yet another backplane to be used as third mandrel 801.

Electrodeposition of the second layer 810 of the mother sheet 800 and electrodeposition of the third layer 910 of the third-generation sheet 900 occurs in a similar manner as described herein above with respect to FIG. 6, wherein the father sheet 700 and the mother sheet 800 are used as second and third mandrels 701, 801 for electrodepositing the second layer 810 and the third layer 910, respectively.

Figure 7:
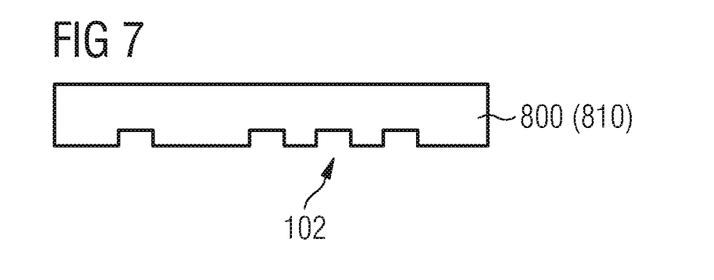
FIG. 7 shows schematically the structure of a mother sheet manufactured from the father sheet by electrodeposition.

The structure of the mother sheet 800 constituting the second layer 810 and exhibiting the inverted profile 102 is schematically illustrated in FIG. 7.

The third-generation sheet 900 is a copy from the mother sheet 800, also known as a son. The third-generation sheet 900 includes the third layer 910 made from electrodeposition and having the profile 101 suitable for embossing the overlay layer 11. The third-generation sheet 900 is preferably ground to provide an even surface and is machined into lamination plates 200. The lamination plates 200 may in particular be placed face down on a surface grinder, equipped with a special grinding wheel. Preferably, the back surface of the lamination plate 200 is also ground flat and parallel to its face side.

Preferably, the lamination plate 200 is cut to its final size by means of a CNC (computer numerical control), water-jet and/or laser cutting apparatus. At this step, optional vacuum holes may be introduced in the lamination plate 200 for facilitating its utilization in the laminator 300.

After thorough cleaning and inspection, the lamination plate 200 may be used for embossing the overlay layer 12 and/or laminating the card body 11 and overlay layer 12, as described herein before.

The invention claimed is:

1. A method of manufacturing a card-shaped data carrier, comprising the steps of:
providing a card body with printed features and with an overlay layer disposed over the printed features;
providing a press tool having a profile corresponding to a predetermined shape registered to and aligned with the printed features on the card body, wherein the profile is provided by an electroformed layer; and
embossing the profile of the press tool in the overlay layer;
wherein the profile is an inversion of structural features formed on the overlay layer by the press tool;
wherein the step of providing the press tool further includes:
providing a master sheet by applying varnish on a first overlay layer disposed on a first card body having printed features, wherein the varnish is applied in at least one area of a surface of the first overlay layer to create a varnish layer corresponding to the predetermined shape registered to the printed features on the first card body:
metalizing a surface of the master sheet in at least the area of the varnish layer; and
manufacturing a father sheet including the profile corresponding to the predetermined shape from the master sheet, wherein manufacturing of the profile of the father sheet includes:
connecting the master sheet to a cathode of a DC current source to provide a first mandrel in an electroforming apparatus; and
forming a first layer in at least the area of the varnish layer of the master sheet by electrodeposition in the electroforming apparatus;
manufacturing a mother sheet, including an inverted profile, from the father sheet, wherein manufacturing of the inverted profile of the mother sheet includes:
connecting the father sheet to a cathode of a DC current source to provide a second mandrel in an electroforming apparatus;
forming a second layer in at least the area of the profile of the father sheet by electrodeposition in the electroforming apparatus; and
manufacturing a third-generation sheet including the profile corresponding to the predetermined shape from the mother sheet, wherein manufacturing of the profile of the third-generation sheet includes:
connecting the mother sheet to a cathode of a DC current source to provide a third mandrel of the electroforming apparatus; and
forming a third layer in at least the area of the inverted profile of the mother sheet by electrodeposition in the electroforming apparatus.

2. The method according to claim 1, the step of embossing the profile in the overlay layer of the card body further comprising:
pressing the profile disposed on the first layer of the father sheet or the third layer of the third-generation sheet into the overlay layer disposed on the card body.

3. The method according to claim 2, wherein the step of pressing the profile into the overlay layer further comprises:
providing the profile disposed on the first layer of the father sheet or the third layer of the third-generation sheet as a lamination plate and
laminating the overlay layer to the card body by pressing the lamination plate into the overlay layer disposed on the card body.

4. The method according to claim 3, wherein the step of laminating the overlay layer to the card body further includes transferring heat from the lamination plate to the overlay layer.

5. The method according to claim 3, wherein the overlay layer is laminated to the card body by means of a laminator adapted for single-sheet lamination.

6. The method according to claim 3, wherein the step of laminating the overlay layer to the card body further includes:
fixing at least one of the overlay layer and the card body with respect to the lamination plate by means of vacuum suction.

7. The method according to claim 1, wherein at least one of the first, second and third layer comprises at least one of nickel, cobalt and an alloy thereof.

8. The method according to claim 1, comprising the step of grinding the electroformed layer so as to provide the profile with an even contact surface.

9. The method according to claim 1, wherein the profile includes an inverse lens structure.

10. The method according to claim 1, further comprising creating an image element on the card body underneath the overlay layer structure by laser inscription through the overlay layer after embossing the profile of the press tool in the overlay layer.

11. A lamination plate for embossing an overlay layer of a card-shaped data carrier, comprising a profile with a predetermined shape, the profile being registered to and aligned with printed features on a card body of the data carrier;
wherein the profile is provided by an electroformed layer;
wherein the profile is an inversion of structural features formed on the overlay layer by a press tool;
wherein the press tool is provided with a master sheet having a varnish applied on a first overlay layer disposed on a first card body having printed features, wherein the varnish is applied in at least one area of a surface of the first overlay layer to create a varnish layer corresponding to the predetermined shape registered to the printed features on the first card body;
wherein a surface of the master sheet is metalized in at least the area of the varnish layer;
wherein the press tool is further provided with a father sheet including the profile corresponding to the predetermined shape from the master sheet;
wherein the master sheet is connected to a cathode of a DC current source provided to a first mandrel in an electroforming apparatus; and
wherein a first layer is formed in at least the area of the varnish layer of the master sheet by electrodeposition in the electroforming apparatus.

12. The lamination plate according to claim 11, wherein the layer comprises at least one of nickel, cobalt and an alloy thereof.

13. A laminator, comprising a lamination plate according to claim 11.

14. A method of manufacturing a card-shaped data carrier, comprising the steps of:
  providing a card body with printed features and with an overlay layer disposed over the printed features;
  providing a press tool having a profile corresponding to a predetermined shape registered to the printed features on the card body, wherein the profile is provided by an electroformed layer; and
  embossing the profile of the press tool in the overlay layer;
  wherein the step of providing the press tool further comprises:
    providing a master sheet by applying varnish on a first overlay layer disposed on a first card body having printed features, wherein the varnish is applied in at least one area of a surface of the first overlay layer to create a varnish layer corresponding to the predetermined shape registered to the printed features on the first card body;
    metalizing a surface of the master sheet in at least the area of the varnish layer; and
    manufacturing a father sheet including the profile corresponding to the predetermined shape from the master sheet, wherein manufacturing of the profile of the father sheet includes:
      connecting the master sheet to a cathode of a DC current source to provide a first mandrel in an electroforming apparatus and
      forming a first layer in at least the area of the varnish layer of the master sheet by electrodeposition in the electroforming apparatus;
    manufacturing a mother sheet, including an inverted profile, from the father sheet, wherein manufacturing of the inverted profile of the mother sheet includes:
      connecting the father sheet to a cathode of a DC current source to provide a second mandrel in an electroforming apparatus;
      forming a second layer in at least the area of the profile of the father sheet by electrodeposition in the electroforming apparatus; and
    manufacturing a third-generation sheet including the profile corresponding to the predetermined shape from the mother sheet, wherein manufacturing of the profile of the third-generation sheet includes:
      connecting the mother sheet to a cathode of a DC current source to provide a third mandrel of the electroforming apparatus and
  forming a third layer in at least the area of the inverted profile of the mother sheet by electrodeposition in the electroforming apparatus.

\* \* \* \* \*